United States Patent
Moriyama et al.

(10) Patent No.: US 10,094,983 B2
(45) Date of Patent: Oct. 9, 2018

(54) OPTICAL CONNECTOR

(71) Applicant: FUJITSU COMPONENT LIMITED, Tokyo (JP)

(72) Inventors: Satoshi Moriyama, Tokyo (JP); Shinichiro Akieda, Tokyo (JP); Osamu Daikuhara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/991,034

(22) Filed: Jan. 8, 2016

(65) Prior Publication Data

US 2016/0223760 A1 Aug. 4, 2016

(30) Foreign Application Priority Data

Feb. 3, 2015 (JP) ................................ 2015-019449

(51) Int. Cl.
G02B 6/38 (2006.01)

(52) U.S. Cl.
CPC ......... *G02B 6/3861* (2013.01); *G02B 6/3885* (2013.01); *G02B 6/387* (2013.01)

(58) Field of Classification Search
None
See application file for complete search history.

(56) References Cited

U.S. PATENT DOCUMENTS

| | | | | | |
|---|---|---|---|---|---|
| 4,818,059 A * | 4/1989 | Kakii | ................... | G02B 6/3839 385/65 |
| 5,257,334 A * | 10/1993 | Takahashi | ............ | G02B 6/3822 385/63 |
| 5,315,678 A * | 5/1994 | Maekawa | ............ | G02B 6/3839 385/59 |
| 5,602,951 A * | 2/1997 | Shiota | ................... | G02B 6/3839 385/59 |
| 5,810,968 A * | 9/1998 | Dannoux | ................. | G02B 6/30 156/293 |
| 5,815,621 A * | 9/1998 | Sakai | ..................... | B24B 19/226 264/1.1 |
| 6,226,429 B1 | 5/2001 | Hikita et al. | | |
| 6,496,624 B1 | 12/2002 | Hikita et al. | | |
| 6,873,770 B2 * | 3/2005 | Leung | .................. | G02B 6/3636 385/137 |
| 2010/0322564 A1 | 12/2010 | Shimotsu et al. | | |
| 2013/0163936 A1* | 6/2013 | Ohta | ..................... | G02B 6/3861 385/80 |

FOREIGN PATENT DOCUMENTS

| | | |
|---|---|---|
| EP | 1039324 | 9/2000 |
| JP | 2000-002820 | 1/2000 |
| JP | 2008-003117 | 1/2008 |
| JP | 2008-089879 | 4/2008 |

\* cited by examiner

*Primary Examiner* — Ryan Lepisto
*Assistant Examiner* — Erin Chiem
(74) *Attorney, Agent, or Firm* — IPUSA, PLLC (57) ABSTRACT

An optical connector includes an optical waveguide, a ferrule base including an attaching part to which the optical waveguide is bonded with an adhesive, and a ferrule cover attached to the ferrule base to cover the attaching part. The ferrule base further includes a preventing part that is formed on the attaching part and prevents leakage of the adhesive from the ferrule base.

8 Claims, 12 Drawing Sheets

OPTICAL CONNECTOR

CROSS-REFERENCE TO RELATED APPLICATION

The present application is based upon and claims the benefit of priority of Japanese Patent Application No. 2015-019449, filed on Feb. 3, 2015, the entire contents of which are incorporated herein by reference.

BACKGROUND OF THE INVENTION

1. Field of the Invention

An aspect of this disclosure relates to an optical connector.

2. Description of the Related Art

An optical connector includes a ferrule, and an optical waveguide for propagating light is attached to the ferrule. Also, a type of optical connector includes lenses disposed in a ferrule to face cores of an optical waveguide so that light is propagated via the lenses and splice loss is reduced. To reduce splice loss, it is necessary to accurately position and fix the cores of the optical waveguide and the lenses of the ferrule.

For this purpose, in Japanese Laid-Open Patent Publication No. 2008-089879, a ferrule is comprised of a ferrule base and a ferrule cover, an optical waveguide is sandwiched between the ferrule cover and the ferrule base after positioning lenses and the optical waveguide, and the ferrule cover, the ferrule base, and the optical waveguide are bonded together using an adhesive. As the adhesive, an ultraviolet curable adhesive is used.

With the technology of Japanese Laid-Open Patent Publication No. 2008-089879, however, there is a problem that the adhesive, which has not been cured, leaks through a gap between the ferrule base and the ferrule cover when the optical waveguide is sandwiched between the ferrule base and the ferrule cover. When the adhesive leaks through the gap between the ferrule base and the ferrule cover, an extra step to remove the leaked adhesive becomes necessary and the process of assembling an optical connector becomes complicated.

SUMMARY OF THE INVENTION

In an aspect of this disclosure, there is provided an optical connector that includes an optical waveguide, a ferrule base including an attaching part to which the optical waveguide is bonded with an adhesive, and a ferrule cover attached to the ferrule base to cover the attaching part. The ferrule base further includes a preventing part that is formed on the attaching part and prevents leakage of the adhesive from the ferrule base.

DESCRIPTION OF EMBODIMENTS

Embodiments of the present invention are described below with reference to the accompanying drawings.

Throughout the accompanying drawings, the same or corresponding reference numbers are assigned to the same or corresponding components, and repeated descriptions of those components are omitted. Unless otherwise mentioned, the drawings do not indicate relative sizes of components. A person skilled in the art may determine actual sizes of components taking into account the embodiments described below.

The embodiments described below are examples, and the present invention is not limited to those embodiments. Not all of the features and their combinations described in the embodiments may be essential to the present invention.

FIGS. 1 through 5 illustrate an optical connector 1A according to a first embodiment. The optical connector 1A includes a ferrule base 2, a ferrule cover 3, a boot 4, and an optical waveguide 5.

Figure 1:
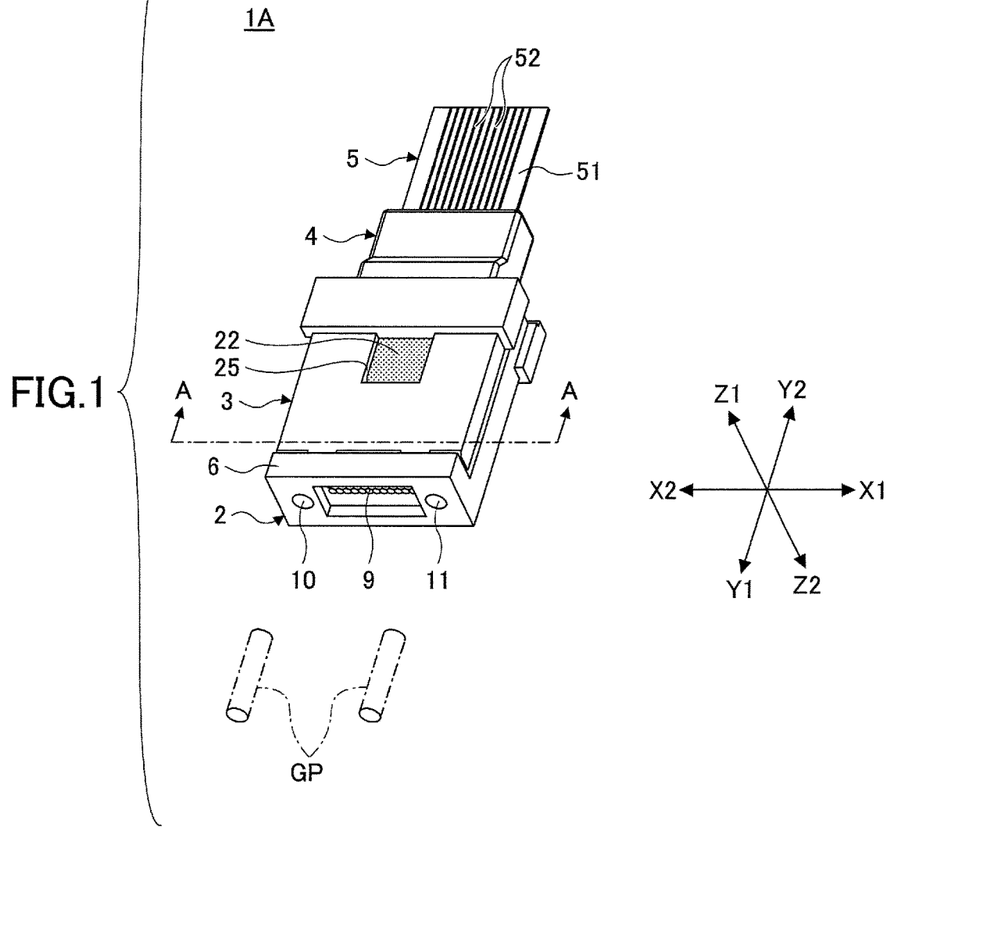
FIG. 1 is a perspective view of an optical connector according to a first embodiment.
Figure 2:
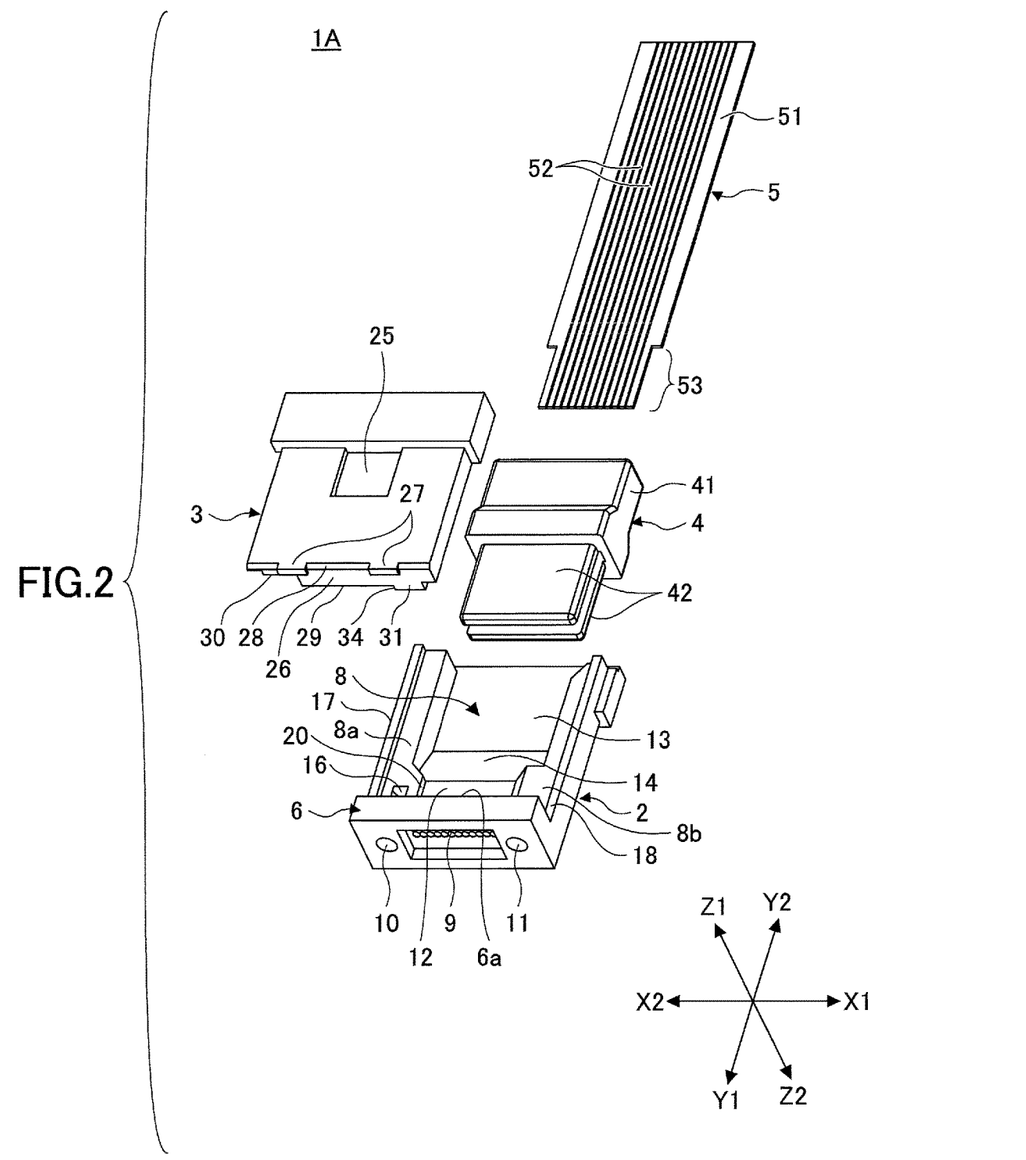
FIG. 2 is an exploded perspective view of an optical connector according to the first embodiment.
Figure 3A:
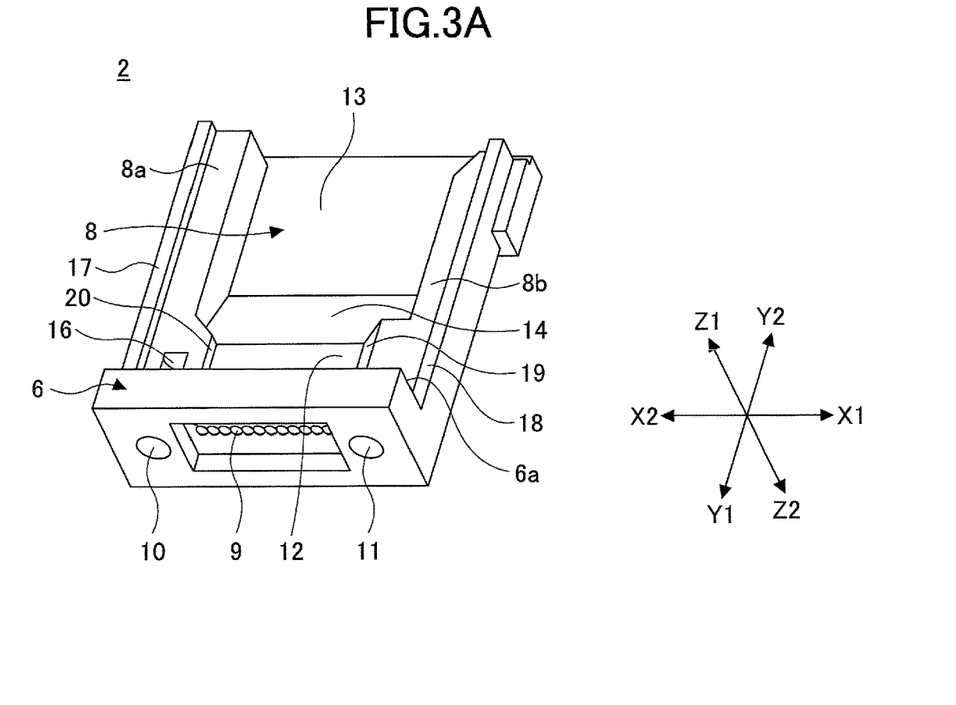
FIG. 3A is a perspective view of a ferrule base of an optical connector according to the first embodiment.
Figure 3B:
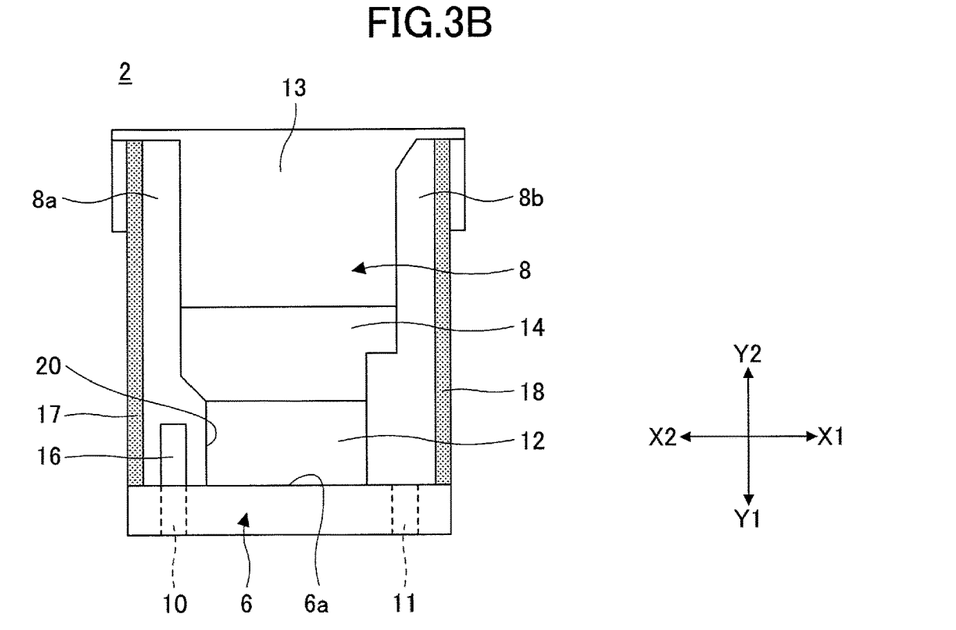
FIG. 3B is a plan view of a ferrule base of an optical connector according to the first embodiment.
Figure 4A:
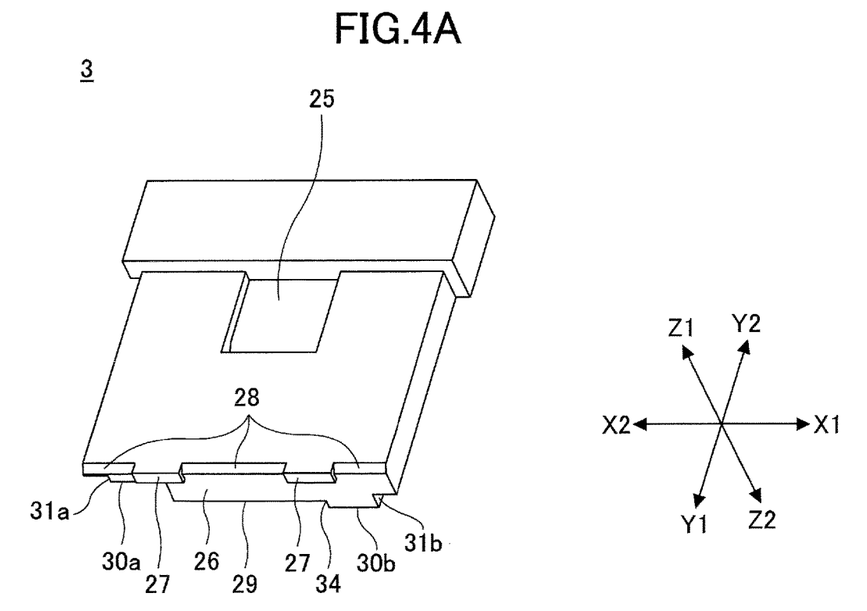
FIG. 4A is a perspective view of a ferrule cover of an optical connector according to the first embodiment.
Figure 4B:
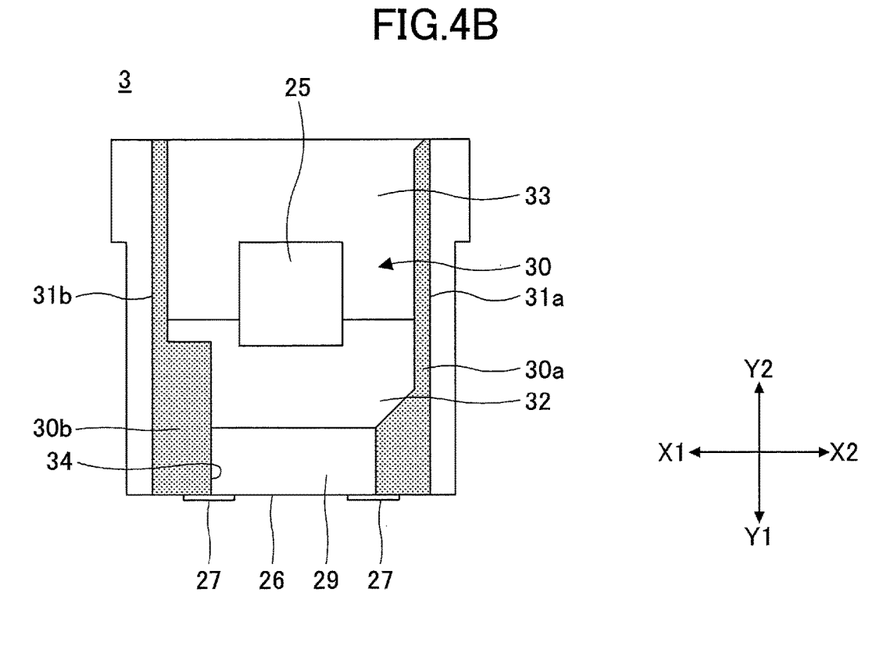
FIG. 4B is a bottom view of a ferrule cover of an optical connector according to the first embodiment.
Figure 5:
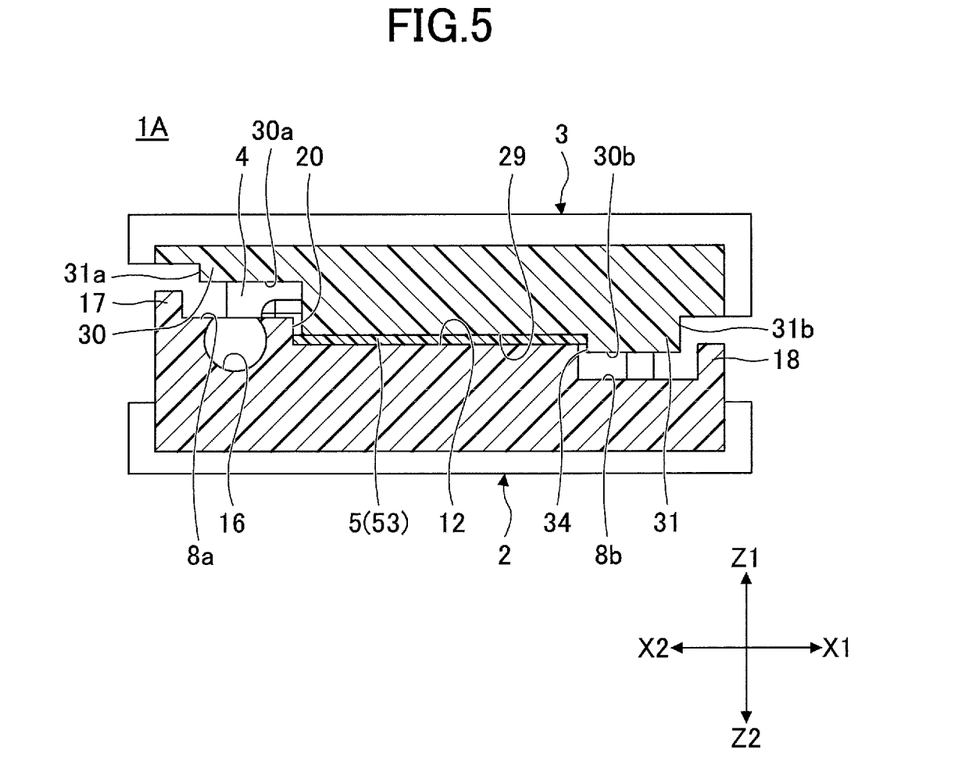
FIG. 5 is a cross-sectional view taken along line A-A of FIG. 1.

FIG. 1 is a perspective view of the optical connector 1A, and FIG. 2 is an exploded perspective view of the optical connector 1A. FIGS. 3A and 3B illustrate the ferrule base 2, FIGS. 4A and 4B illustrate the ferrule cover 3, and FIG. 5 is a cross-sectional view taken along line A-A of FIG. 1.

In the drawings, an X1/X2 direction indicates a width direction of the optical connector 1A, a Y1/Y2 direction indicates a longitudinal direction (forward/backward direction) of the optical connector 1A, and a Z1/Z2 direction indicates a vertical direction (upward/downward direction) of the optical connector 1A.

The ferrule base 2 is formed by molding a resin that is transparent to propagating light for example. As illustrated by FIGS. 1 through 3B, the ferrule base 2 includes a connecting part 6, a lens array 9, a cover attaching part 8, guide pin holes 10 and 11, an attaching surface 12, a boot attaching part 13, and protruding walls 17 and 18.

The connecting part 6 is at the front end of the ferrule base 2 and is in an upright position with respect to the cover attaching part 8. Another optical connector is to be connected to the connecting part 6. The lens array 9 is formed in the connecting part 6.

The ferrule cover 3 is attached and fixed with an adhesive 22 to the cover attaching part 8. The cover attaching part 8 is formed behind the connecting part 6 at a position closer to the Y2 end. The rear end of the cover attaching part 8 adjoins the rear surface of the ferrule base 2. The connecting part 6 and the cover attaching part 8 form an L-shape in side view.

Upper surfaces 8a and 8b extending in the longitudinal direction are formed at the corresponding sides of the cover attaching part 8. The attaching surface 12 and a sloping surface 14 are formed between the upper surfaces 8a and 8b.

The lens array 9 is comprised of multiple small lenses arranged in a row in the width direction. When the optical waveguide 5 is attached to the ferrule base 2, the small lenses constituting the lens array 9 face ends of cores 52 of the optical waveguide 5.

A rear surface of the connecting part 6 which faces the Y2 direction is formed to accurately match the front end of the optical waveguide 5 that is placed in the ferrule base 2. Hereafter, the rear surface of the connecting part 6 is referred to as an "end reference surface 6a". To position the optical waveguide 5, the front end of the optical waveguide 5 is brought into contact with the end reference surface 6a. As a result, the position of the optical waveguide 5 in the longitudinal direction in the ferrule base 2 is determined.

The guide pin holes 10 and 11 are formed in the connecting part 6 at the corresponding side positions in the width direction. Guide pins GP (see FIG. 1) are to be inserted into the guide pin holes 10 and 11. The guide pins GP are used to position another optical connector to be connected to the optical connector 1A.

The guide pin holes 10 and 11 do not pass through the ferrule base 2 in the longitudinal direction. More specifically, although the guide pin holes 10 and 11 pass through the connecting part 6, the guide pin holes 10 and 11 do not pass through the cover attaching part 8 that extends from the end reference surface 6a of the connecting part 6 to the rear surface of the ferrule base 2.

Compared with a configuration where the guide pin holes 10 and 11 pass through the ferrule base 2, the configuration where the guide pin holes 10 and 11 do not pass through the ferrule base 2 makes it possible to improve the flexibility in disposing the optical waveguide 5 in the ferrule base 2.

Figure 6:
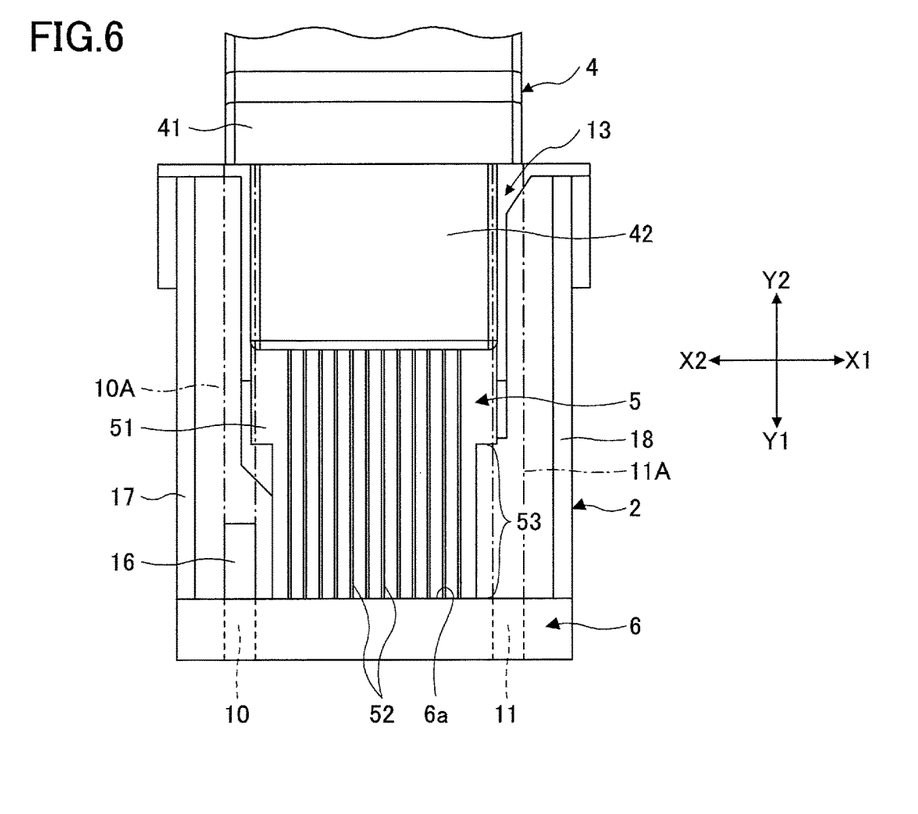
FIG. 6 is a plan view of a ferrule base, an optical waveguide, and a boot fitted together.

As a comparative example, when guide pin holes 10A and 11A are formed to pass through the ferrule base 2 in the Y1/Y2 direction as indicated by dashed-dotted lines in FIG. 6, the guide pin holes 10A and 11A interfere with the optical waveguide 5 and the position in the ferrule base 2 where the optical waveguide 5 can be placed is limited.

On the other hand, with the configuration where the guide pin holes 10 and 11 do not pass through the ferrule base 2 in the Y1/Y2 direction, it is possible to widen the space in the ferrule base 2 where the optical waveguide 5 is placed.

In the present embodiment, an insertion groove 16 is formed in the upper surface 8a corresponding to the guide pin hole 10, and the guide pin is inserted up to the end of the insertion groove 16.

The attaching surface 12 is a surface for determining the vertical position of the optical waveguide 5. The attaching surface 12 is formed in front of the cover attaching part 8. The optical waveguide 5 is placed on the attaching surface 12. The attaching surface 12 is formed such that the height of the attaching surface 12 accurately matches the height of the optical waveguide 5 in the ferrule base 2. When the optical waveguide 5 is attached to the ferrule base 2, the optical waveguide 5 is pressed against the attaching surface 12 to determine the position of the optical waveguide 5 in the vertical direction.

As illustrated in FIG. 5, the attaching surface 12 is positioned lower than the upper surface 8a. Accordingly, a step is formed between the upper surface 8a and the attaching surface 12.

A vertical surface of the step between the upper surface 8a and the attaching surface 12 is formed to accurately match a side edge (which faces the X2 direction) of the optical waveguide 5 that is placed in the ferrule base 2. Hereafter, the vertical surface formed between the upper surface 8a and the attaching surface 12 is referred to as a "first reference surface 20".

A sloping surface 19 is formed to face the first reference surface 20 across the attaching surface 12. The attaching surface 12 including a part of the sloping surface 14 is connected via the sloping surface 19 with the upper surface 8b. The upper surface 8b is positioned lower than the attaching surface 12. Accordingly, the sloping surface 19 extends from the attaching surface 12 obliquely downward to the upper surface 8b.

Because the upper surface 8a is positioned higher than the attaching surface 12, the relationship in height among the upper surface 8a, the upper surface 8b, and the attaching surface 12 is expressed by "height of the upper surface 8a">"height of the attaching surface 12">"height of the upper surface 8b".

The boot 4 for protecting the optical waveguide 5 is placed in the boot attaching part 13. More specifically, with the ferrule cover 3 attached to the ferrule base 2, the boot 4 is placed into a space formed between the boot attaching part 13 and a boot attaching part 33 of the ferrule cover 3.

The boot attaching part 13 is formed in a position lower than the attaching surface 12. The shape of the boot attaching part 13 corresponds to the shape of the boot 4. The boot attaching part 13 is connected with the attaching surface 12 via the sloping surface 14.

The protruding wall 17 protruding upward is formed at the outer edge of the upper surface 8a. The protruding wall 17 extends in the longitudinal direction along the longitudinal edge (X2 side edge) of the upper surface 8a. The front end of the protruding wall 17 adjoins the connecting part 6, and the rear end of the protruding wall 17 extends to the rear surface of the ferrule base 2.

The protruding wall 18 protruding upward is formed at the outer edge of the upper surface 8b. The protruding wall 18 extends in the longitudinal direction along the longitudinal edge (X1 side edge) of the upper surface 8b. The front end of the protruding wall 18 adjoins the connecting part 6, and the rear end of the protruding wall 18 extends to the rear surface of the ferrule base 2. In FIG. 3B, the protruding walls 17 and 18 are indicated by shaded areas.

The ferrule cover 3 is attached to the ferrule base 2. As illustrated by FIGS. 1, 2, 4A, and 4B, the ferrule cover 3 includes a window 25, a front end face 26, a pressing part 29, a facing part 30, a sloping surface 32, and a boot attaching part 33.

In the descriptions below, a surface on the Y1 side of the ferrule cover 3 that faces the connecting part 6 when the ferrule cover 3 is attached to the ferrule base 2 may be referred to as a "front surface", and a surface on the Y2 side of the ferrule cover 3 opposite from the front surface may be referred to as a "rear surface".

The window 25 is an opening that passes through the ferrule cover 3 in the vertical direction, and is formed in substantially the center of the ferrule cover 3. The window 25 functions as an adhesive port for introducing the adhesive 22 into the ferrule base 2.

The front end face 26 of the ferrule cover 3 faces the end reference surface 6a of the connecting part 6 when the ferrule cover 3 is attached to the ferrule base 2. A pair of protrusions 27, which are arranged apart from each other in the width direction, are formed at the upper end of the front end face 26. The protrusions 27 protrude forward from the front end face 26.

Also, beveled parts 28 are formed in portions of the upper end of the front end face 26 where the protrusions 27 are not formed. The beveled parts 28 are sloping surfaces having a predetermined angle with respect to the front end face 26.

The facing part 30 that faces the ferrule base 2 is formed on the lower surface of the ferrule cover 3. Lower surfaces 30a and 30b are formed on the corresponding sides of the facing part 30 of the ferrule cover 3. As illustrated in FIG. 4B, the lower surfaces 30a and 30b extend in the longitudinal direction. A step 31a is formed at the outer side of the lower surface 30a, and a step 31b is formed at the outer side of the lower surface 31b.

The pressing part 29, the sloping surface 32, and the boot attaching part 33 are formed between the lower surfaces 30a and 30b.

The pressing part 29 presses the optical waveguide 5 against the attaching surface 12 when the ferrule cover 3 is attached to the ferrule base 2. The pressing part 29 is formed at the front end of the facing part 30. As illustrated by FIG. 5, the pressing part 29 is positioned higher than the lower surface 30b, and a vertical surface 34 extending in the vertical direction is formed at a step between the lower surface 30b and the pressing part 29. The vertical surface 34 contacts a side surface of the optical waveguide 5 when the optical waveguide 5 is positioned on the ferrule base 2. Hereafter, the vertical surface 34 is referred to as a "contact surface 34".

Because the lower surface 30a is positioned higher than the pressing part 29, as illustrated in FIG. 5, the relationship in height among the lower surface 30a, the lower surface 30b, and the pressing part 29 when the ferrule cover 3 is attached to the ferrule base 2 is expressed by "height of the lower surface 30a">"height of the pressing part 29">"height of the lower surface 30b".

The boot 4 is placed in the boot attaching part 33. The boot attaching part 33 is positioned higher than the pressing part 29.

The boot 4 protects the optical waveguide 5, and is formed by an elastic material. As illustrated in FIG. 2, the boot 4 includes a body 41 and guides 42.

The body 41 holds the optical waveguide 5. An insertion hole into which the optical waveguide 5 is inserted is formed in the body 41. A pair of guides 42 are formed on the front surface of the body 41 to face each other across the insertion hole. Each guide 42 has a cantilever structure where one end of the guide 42 is fixed to the body 41, and another end of the guide 42 is a free end.

The optical waveguide 5 includes a film-like base 51 and multiple cores 52 disposed in the base 51. A narrow part 53 is formed at the front end of the optical waveguide 5. As illustrated in FIG. 6, when the optical waveguide 5 is attached to the boot 4, the narrow part 53 protrudes forward from a space between the guides 42. The pitch between the lenses of the lens array 9 formed in the connecting part 6 is set at the same value as the pitch between the cores 52 of the optical waveguide 5.

As a first step to assemble the optical connector 1A, the optical waveguide 5 is inserted into the boot 4. Next, the boot 4 with the optical waveguide 5 inserted is placed on the cover attaching part 8 of the ferrule base 2. Prior to this step, the adhesive 22 is applied to the attaching surface 12 to which the optical waveguide 5 is attached.

As illustrated in FIG. 6, when the boot 4 is placed on the cover attaching part 8, the guides 42 are positioned in the boot attaching part 13, and the narrow part 53 is positioned on the attaching surface 12.

When attaching the optical waveguide 5 to the attaching surface 12, the front end (Y1 end) of the optical waveguide 5 is brought into contact with the end reference surface 6a of the connecting part 6. With the front end of the optical waveguide 5 brought into contact with the end reference surface 6a, the position of the optical waveguide 5 in the longitudinal direction in the ferrule base 2 is determined.

The adhesive 22 is an ultraviolet curable adhesive, and is fluid until being cured by irradiation of ultraviolet light. Accordingly, until the adhesive 22 is cured, the position of the narrow part 53 on the attaching surface 12 can be changed.

After the boot 4 and the optical waveguide 5 are attached to the ferrule base 2, the ferrule cover 3 is attached to the ferrule base 2.

The protruding walls 17 and 18 are formed at the corresponding side edges of the upper surfaces 8a and 8b of the ferrule base 2, and the steps 31a and 31b are formed at the outer sides of the lower surfaces 30a and 31b of the ferrule cover 3. The protruding walls 17 and 18 and the steps 31a and 31b are formed at positions that can be easily seen from the outside. Also, the protruding walls 17 and 18 are arranged such that they are positioned outside of the steps 31a and 31b when the ferrule cover 3 is attached to the ferrule base 2 (see FIG. 5).

With this configuration, the position of the ferrule cover 3 relative to the ferrule base 2 can be easily determined by attaching the ferrule cover 3 to the ferrule base 2 such that the steps 31a and 31b are inserted between the protruding walls 17 and 18.

Also, when attaching the ferrule cover 3 to the ferrule base 2, the X1 end of the narrow part 53 is brought into contact with the contact surface 34 of the ferrule cover 3 as illustrated in FIG. 5. Then, in this state, the ferrule cover 3 is moved in the X2 direction to bring the X2 end of the optical waveguide 5 into contact with the first reference surface 20. With the X2 end of the optical waveguide 5 brought into contact with the first reference surface 20, the position of the optical waveguide 5 in the width direction is determined.

Next, while keeping the X2 end of the optical waveguide 5 in contact with the first reference surface 20 and the Y1 end of the optical waveguide 5 in contact with the end reference surface 6a, the ferrule cover 3 is pressed against the ferrule base 2. When the ferrule cover 3 is pressed, the pressing part 29 presses the narrow part 53 against the attaching surface 12, and the position of the optical waveguide 5 in the vertical direction is determined.

When the optical waveguide 5 is placed in the predetermined position in the ferrule base 2, the front ends of the cores 52 of the optical waveguide 5 are accurately positioned to face the lenses of the lens array 9 formed in the connecting part 6. This makes it possible to prevent the transmission efficiency of an optical signal from being reduced at the junction between the front ends of the cores 52 and the lens array 9.

After placing the optical waveguide 5 in the predetermined position and while keeping the optical waveguide 5 in the predetermined position, the adhesive 22 is introduced via the window 25 into a space between the ferrule base 2 and the ferrule cover 3.

Because the window 25 is formed in the upper surface of the ferrule cover 3, it is possible to introduce the adhesive 22 from the upper side of the optical connector 1A into the space between the ferrule base 2 and the ferrule cover 3. This in turn makes it easier to introduce the adhesive 22 into the space. Also, because the boot 4 is disposed below the window 25, it is possible to directly apply the adhesive 22 to the boot 4 by introducing the adhesive 22 via the window 25.

Figure 7:
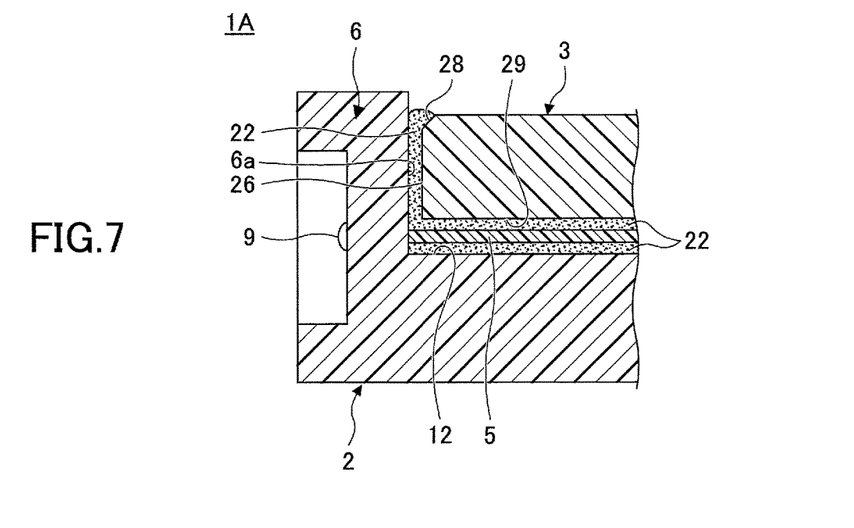
FIG. 7 is a partial cut-away side view of a ferrule base and a ferrule cover.

When the ferrule cover 3 is attached to the ferrule base 2, the front end face 26 of the ferrule cover 3 faces the end reference surface 6a of the connecting part 6. Because the protrusions 27 formed on the front end face 26 contact the end reference surface 6a, a gap is formed between the end reference surface 6a and the front end face 26 as illustrated in FIG. 7. In FIG. 7, the protrusions 27 contacting the end reference surface 6a are not illustrated.

The adhesive 22 applied to the attaching surface 12 and the adhesive 22 introduced via the window 25 enter the gap between the end reference surface 6a and the front end face 26 when the optical waveguide 5 is positioned and the ferrule cover 3 is attached. The end reference surface 6a and the front end face 26 are bonded to each other by the adhesive 22 entered the gap.

To reliably bond the end reference surface 6a and the front end face 26, it is preferable to fill the gap with a sufficient amount of the adhesive 22. On the other hand, it is not desirable that the adhesive 22 leaks from the upper end of the gap onto the upper surface of the ferrule cover 3.

The beveled parts 28 formed at the upper end of the front end face 26 function as reservoirs for holding the adhesive 22 entered the gap between the end reference surface 6a and the front end face 26. Thus, the adhesive 22 that flowed upward in the gap and reached the upper end of the gap are held in the beveled parts 28. This configuration makes it possible to reliably bond the end reference surface 6a and the front end face 26 together, and to prevent leakage of the adhesive 22 from the upper end of the gap.

The adhesive 22 introduced via the window 25 is not being cured and is therefore fluid. Therefore, the adhesive 22 introduced via the window 25 also flows onto the upper surfaces 8a and 8b of the cover attaching part 8. If the adhesive 22 flowed onto the upper surfaces 8a and 8b leaks out of the ferrule base 2, it is necessary to remove the leaked adhesive 22.

However, as illustrated in FIG. 5, the protruding walls 17 and 18 protruding upward are formed at the outer edges of the upper surfaces 8a and 8b. The protruding walls 17 and 18 function as dams that prevent the adhesive 22 from leaking out of the ferrule base 2. This configuration makes it possible to prevent the adhesive 22 from leaking out of the ferrule base 2, and to eliminate the need to remove the leaked adhesive 22.

The protruding walls 17 and 18 are not necessarily formed at the outer edges of the upper surfaces 8a and 8b. For example, the protruding walls 17 and 18 may be formed at inner positions of the upper surfaces 8a and 8b.

After the adhesive 22 is introduced via the window 25 to fill the space between the ferrule base 2 and the ferrule cover 3, the adhesive 22 is irradiated with ultraviolet light. The adhesive 22 is cured by the irradiation of ultraviolet light and as a result, the ferrule base 2 and the ferrule cover 3 are fixed together, and the boot 4 and the boot attaching parts 13 and 33 are fixed together. Through the above process, the optical connector 1A is assembled.

Next, optical connectors 1B through 1G of second through seventh embodiments are described with reference to FIGS. 8A through 16B. The same reference numbers as those in FIGS. 1 through 7 are assigned to the corresponding components in FIGS. 8A through 16B, and repeated descriptions of those components are omitted.

FIGS. 8A through 9B are drawings illustrating an optical connector 1B of a second embodiment.

Figure 8A:
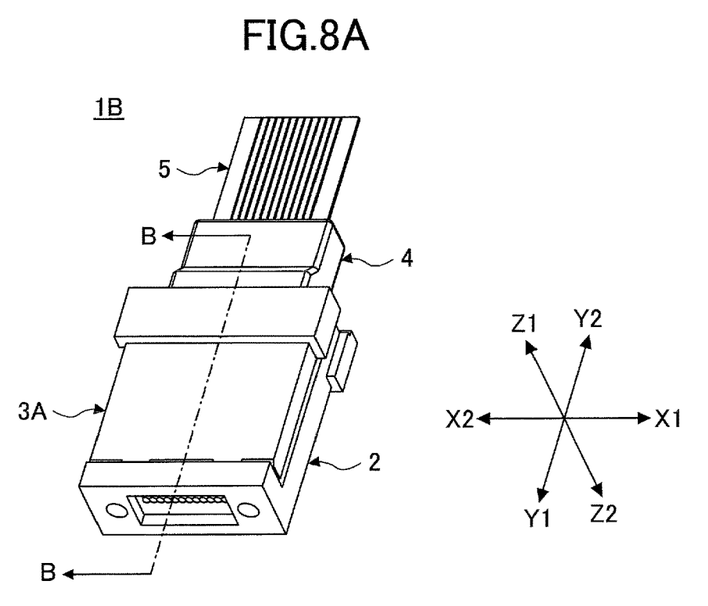
FIG. 8A is a perspective view of an optical connector according to a second embodiment.
Figure 8B:
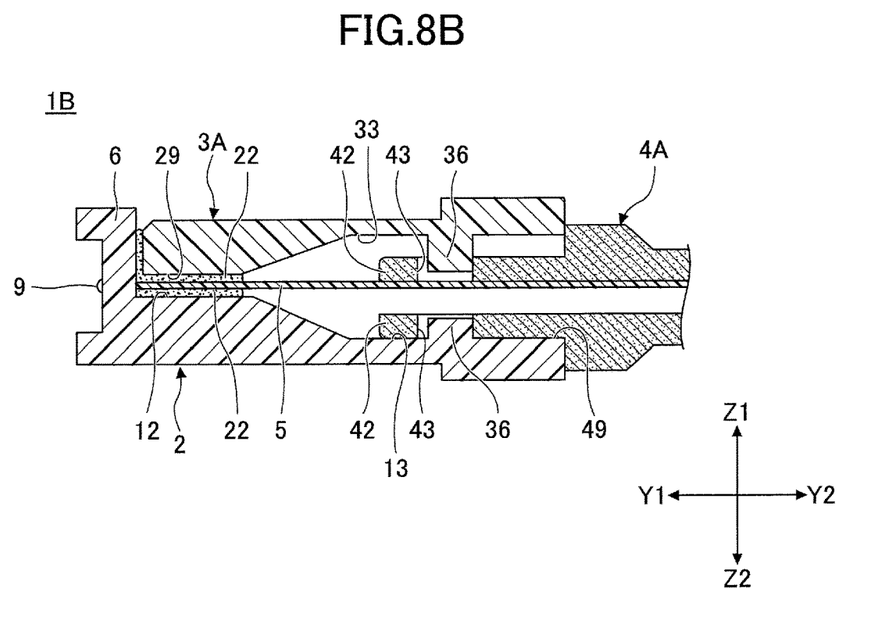
FIG. 8B is a cross-sectional view taken along line B-B of FIG. 8A.

The window 25 is not formed in a ferrule cover 3A of the optical connector 1B. Also, the front end part of the optical waveguide 5 is placed between the attaching surface 12 and the pressing part 29 and bonded with the adhesive 22 to the attaching surface 12 and the pressing part 29.

Figure 9A:
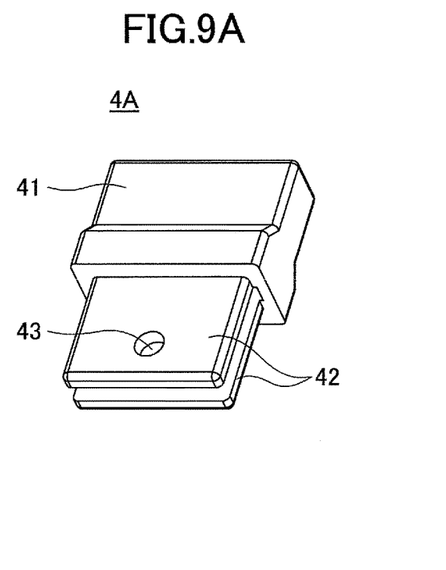
FIGS. 9A and 9B are perspective views of exemplary boots usable for an optical connector of the second embodiment.
Figure 9B:
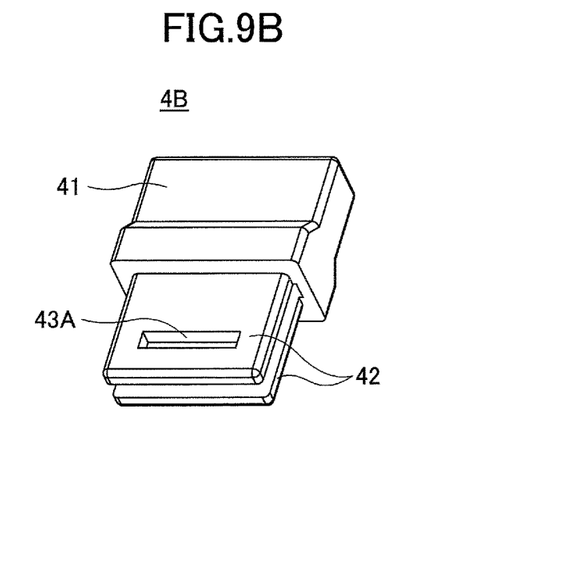

As illustrated in FIG. 9A, engaging holes 43 having a circular cross-sectional shape are formed in the guides 42 of a boot 4A. Also, protrusions 36 protruding inward are formed on the boot attaching parts 13 and 33 at positions corresponding to the positions of the engaging holes 43. In the present embodiment, the protrusions 36 have a columnar shape.

To assemble the optical connector 1B, the ferrule cover 3 is fixed to the ferrule base 2 to form a structure, and the boot 4A is inserted into the structure through an opening 49 formed at the rear end of the structure.

When the boot 4A is inserted through the opening 49 into the structure, the front ends of the guides 42 contact the protrusions 36 formed on the boot attaching parts 13 and 33. Because the boot 4A has elasticity, when the boot 4A is pressed further forward after the guides 42 contact the protrusions 36, the boot 4A is deformed, the front ends of the guides 42 climb over the protrusions 36, and the protrusions 36 engage with the engaging holes 43. With the protrusions 36 engaged with the engaging holes 43, the movement of the boot 4A in the longitudinal direction is prevented.

With the above configuration of the optical connector 1B of the present embodiment, the boot 4A can be fixed to the boot attaching parts 13 and 33 without using any adhesive. This in turn makes it easier to assemble the optical connector 1B.

The cross-sectional shape of the engaging holes 43 is not limited to the circular shape illustrated in FIG. 9A. For example, as in a boot 4B of FIG. 9B, rectangular engaging holes 43A may be formed in the guides 42. In this case, the protrusions 36 are also formed to have a rectangular shape that corresponds to the shape of the engaging holes 43A. Also, two or more engaging holes may be formed in each of the guides 42, and two or more protrusions may be formed on each of the boot attaching parts 13 and 33.

Figure 10:
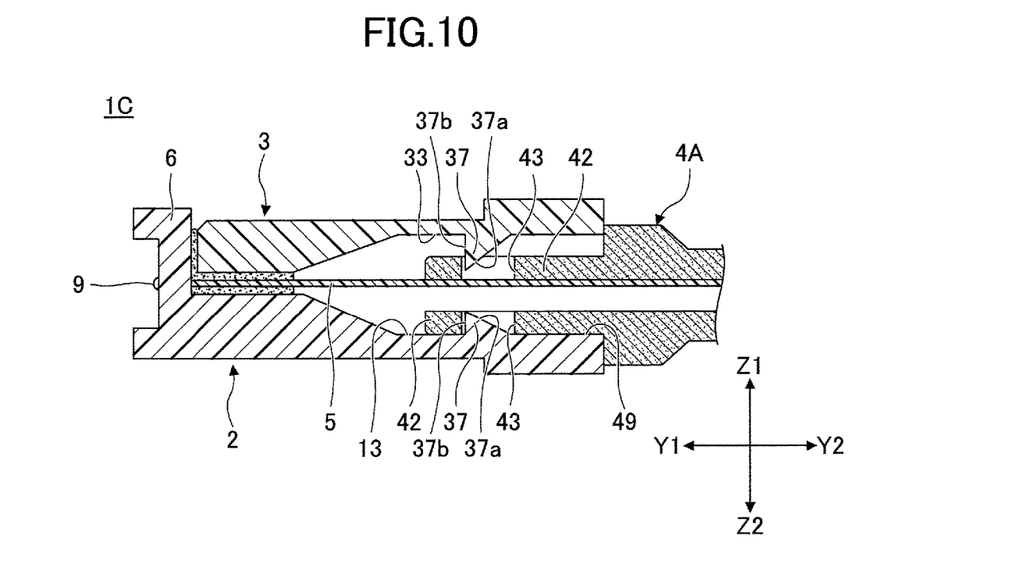
FIG. 10 is a cut-away side view of an optical connector according to a third embodiment.

FIG. 10 is a drawing illustrating an optical connector 1C of a third embodiment.

Similarly to the optical connector 1B, the window 25 is not formed in the ferrule cover 3 of the optical connector 1C.

Also, the front end part of the optical waveguide 5 is placed between and bonded with the adhesive 22 to the attaching surface 12 and the pressing part 29.

In the optical connector 1C, a protrusion 37 having a sloping surface 37a is formed on each of the ferrule base 2 and the ferrule cover 3. With the protrusion 37 having the sloping surface 37a, when the boot 4A is inserted into the opening 49, the front end of the guide 42 is guided by the sloping surface 37a and moves forward. This configuration makes it possible to engage the protrusion 37 with the engaging hole 43 with a smaller insertion force, and makes it easier to assemble the optical connector 1C.

Also, when a force is applied to the boot 4A in a pulling-out direction (Y2 direction), a vertical surface 37b on the front side of each of the protrusions 37 contacts an edge of the corresponding engaging hole 43, and prevents the boot 4A from being detached from the boot attaching parts 13 and 33.

Figure 11:
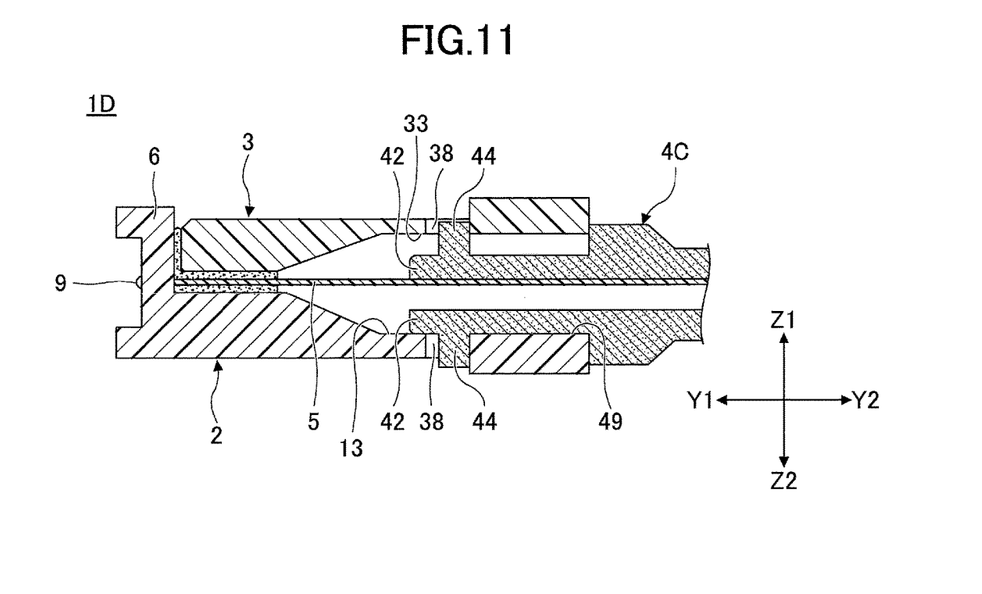
FIG. 11 is a cut-away side view of an optical connector according to a fourth embodiment.
Figure 12A:
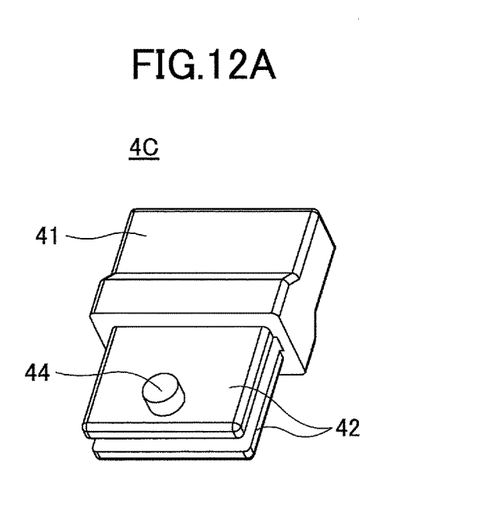
FIGS. 12A and 12B are perspective views of exemplary boots usable for an optical connector of the fourth embodiment.
Figure 12B:
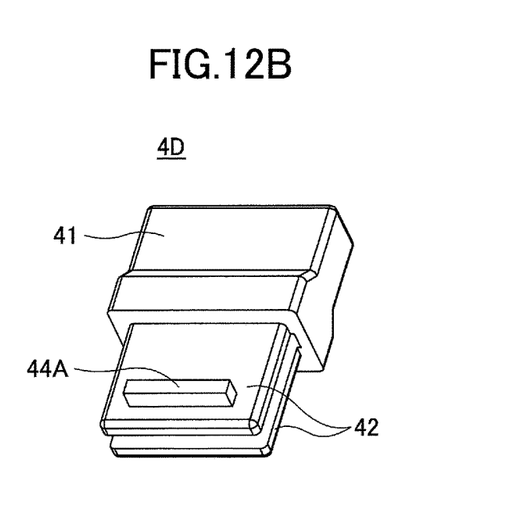

FIGS. 11 through 12B are drawings illustrating an optical connector 1D of a fourth embodiment.

In the optical connector 1D, as illustrated in FIG. 12A, protrusions 44 having a columnar shape are formed on the guides 42 of a boot 4C. Also, engaging holes 38 are formed in the boot attaching parts 13 and 33 at positions corresponding to the positions of the protrusions 44 of the boot 4C.

In the present embodiment, when the boot 4C is inserted through the opening 49, the protrusions 44 contact an edge of the opening 49. When the boot 4C is further pressed forward, the guides 42 are elastically deformed and slide forward on the boot attaching parts 13 and 33. Then, when the protrusions 44 reach the positions of the engaging holes 38, the guides 42 return to the original shape and the protrusions 44 engage with the engaging holes 38.

With the protrusions 44 engaged with the engaging holes 38, the movement of the boot 4C in the longitudinal direction is prevented. With the above configuration of the optical connector 1D, the boot 4C can be fixed to the boot attaching parts 13 and 33 without using any adhesive.

The cross-sectional shape of the protrusions 44 is not limited to a columnar shape. For example, as in a boot 4D of FIG. 12B, rectangular protrusions 44A may be formed on the guides 42. In this case, the engaging holes 38 are also formed to have a rectangular cross-sectional shape. Also, two or more protrusions may be formed on each of the guides 42, and two or more engaging holes may be formed in each of the boot attaching parts 13 and 33.

Figure 13:
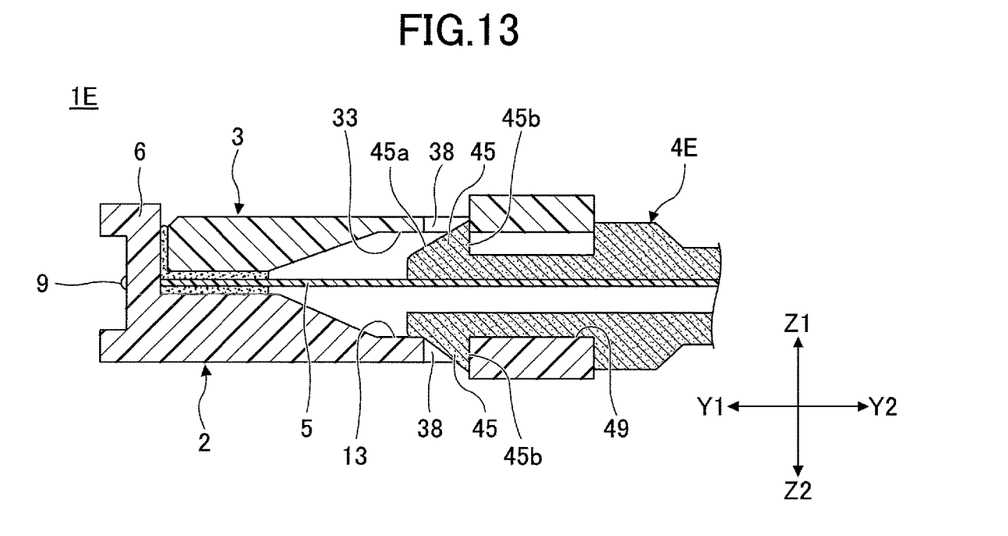
FIG. 13 is a cut-away side view of an optical connector according to a fifth embodiment.
Figure 14:
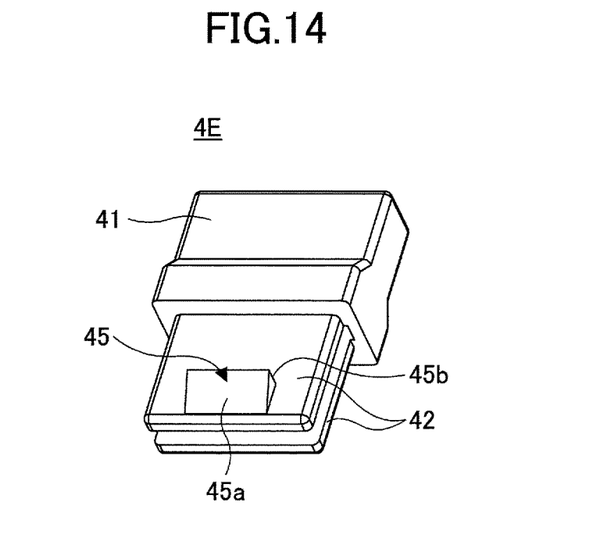
FIG. 14 is a perspective view of an exemplary boot usable for an optical connector of the fifth embodiment.

FIGS. 13 and 14 are drawings illustrating an optical connector 1E of a fifth embodiment.

In the optical connector 1E, as illustrated in FIG. 14, a protrusion 45 having a sloping surface 45a is formed on each of the guides 42 of a boot 4E. With this configuration, when the boot 4E is inserted into a space between the boot attaching parts 13 and 33, the angular end of the protrusion 45 formed by the sloping surface 45a first enters the opening 49.

This configuration makes it possible to smoothly insert the boot 4E into the space between the boot attaching parts 13 and 33 with a small insertion force. Also, when a force is applied to the boot 4E in a pulling-out direction (Y2 direction), a vertical surface 45b on the rear side of each of the protrusions 45 contacts an edge of the corresponding engaging hole 38, and prevents the boot 4E from being detached from the boot attaching parts 13 and 33.

Figure 15A:
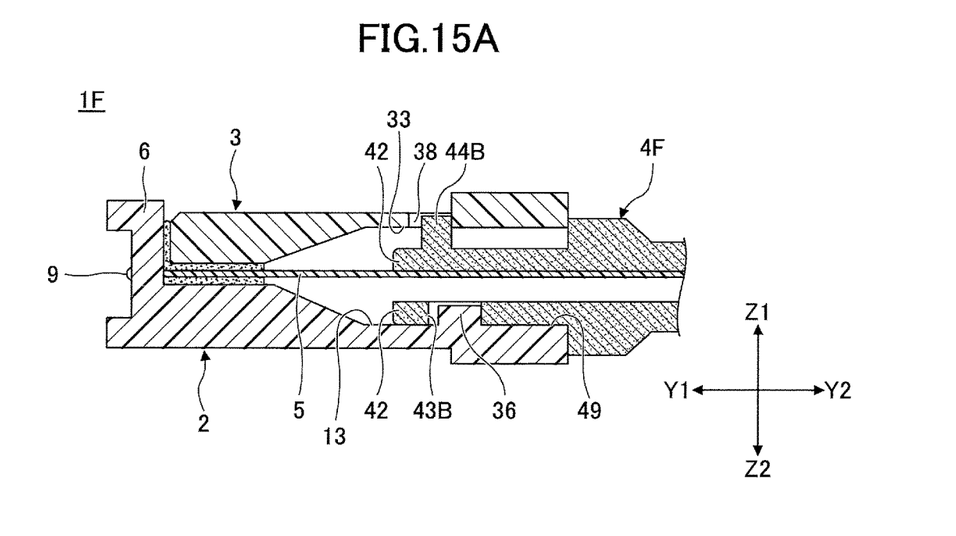
FIG. 15A is a cut-away side view of an optical connector according to a sixth embodiment.
Figure 15B:
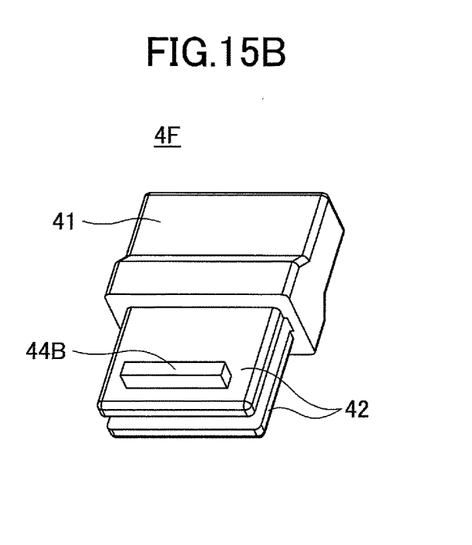
FIGS. 15B and 15C are perspective views of a boot of an optical connector of the sixth embodiment.
Figure 15C:
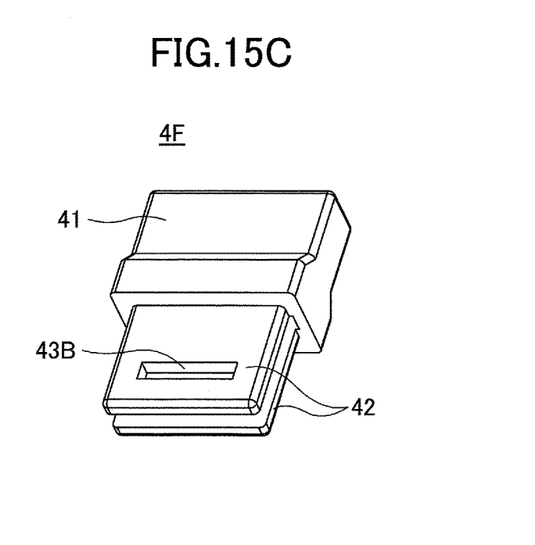

FIGS. 15A through 15C are drawings illustrating an optical connector 1F of a sixth embodiment.

In the optical connector 1F, a protrusion 44B is formed on an upper guide 42 of a boot 4F as illustrated in FIG. 15B, and an engaging hole 43B is formed in a lower guide 42 as illustrated in FIG. 15C. Also, a protrusion 36 is formed on the boot attaching part 13 at a position corresponding to the position of the engaging hole 43B, and an engaging hole 38 is formed in the boot attaching part 33 at a position corresponding to the position of the protrusion 44B.

In the present embodiment, when the boot 4F is inserted through the opening 49, the protrusion 44B contacts the rear surface of the ferrule cover 3, is elastically deformed, and moves forward in the boot attaching part 33. Also, the lower guide 42 contacts the protrusion 36 and is elastically deformed.

When the boot 4F reaches a predetermined position in the boot attaching parts 13 and 33, the protrusion 44B faces the engaging hole 38, and the engaging hole 43B faces the protrusion 36. When the protrusion 44B faces the engaging hole 38, the protrusion 44B returns to the original shape and engages with the engaging hole 38. Similarly, the lower guide 42 returns to the original shape, and the protrusion 36 engages with the engaging hole 43B.

When the protrusion 44B engages with the engaging hole 38 and the protrusion 36 engages with the engaging hole 43B, the movement of the boot 4F in the longitudinal direction is prevented. With the above configuration of the optical connector 1F, the boot 4F can be fixed to the boot attaching parts 13 and 33 without using any adhesive.

Figure 16A:
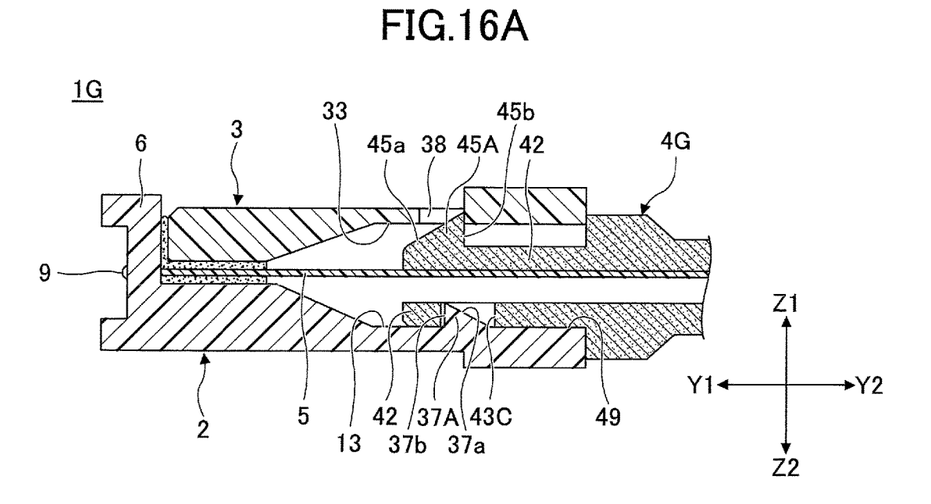
FIG. 16A is a cut-away side view of an optical connector according to a seventh embodiment.
Figure 16B:
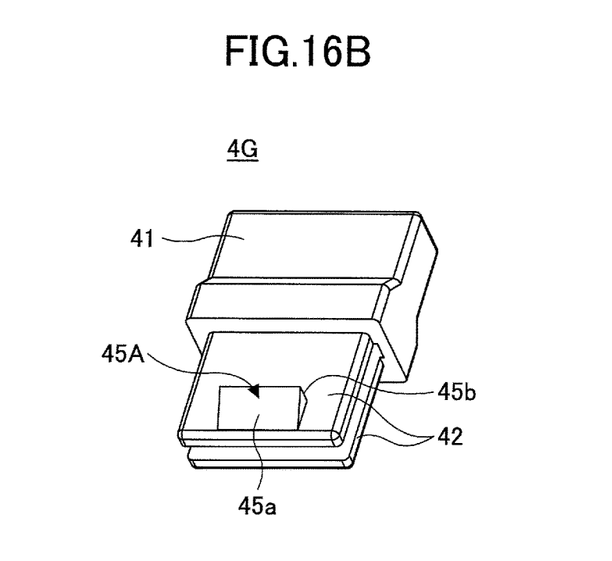
FIG. 16B is a perspective view of a boot of an optical connector of the seventh embodiment.

FIGS. 16A and 16B are drawings illustrating an optical connector 1G of a seventh embodiment.

In the optical connector 1G, as illustrated in FIG. 16B, a protrusion 45A having a sloping surface 45a is formed on the upper guide 42 of a boot 4G. Also, as illustrated in FIG. 16A, a protrusion 37A having a sloping surface 37a is formed in the boot attaching part 13.

With this configuration, when the boot 4G is inserted into a space between the boot attaching parts 13 and 33, the angular end of the protrusion 45A formed by the sloping surface 45a first enters the opening 49. Also when the boot 4G is inserted between the boot attaching parts 13 and 33, the front end of the lower guide 42 moves forward while being guided by the sloping surface 37a.

Accordingly, the boot 4G can be smoothly inserted into the space between the boot attaching parts 13 and 33 with a small insertion force, and the boot 4G can be prevented from being detached from the boot attaching parts 13 and 33 even when a force is applied to the boot 4G in a pulling-out direction (Y2 direction).

As described above, an aspect of this disclosure makes it possible to prevent leakage of an adhesive from a gap between a ferrule base and a ferrule cover of an optical connector, and thereby makes it easier to assemble the optical connector.

Optical connectors according to the embodiments of the present invention are described above. However, the present invention is not limited to the specifically disclosed embodiments, and variations and modifications may be made without departing from the scope of the present invention.

What is claimed is:

1. An optical connector connectable to another optical connector, the optical connector comprising:
   an optical waveguide including a base and multiple cores arranged in the base;
   a ferrule base formed by molding, the ferrule base including
      a cover attaching part including an attaching surface to which the optical waveguide is bonded with an adhesive, and a first upper surface and a second upper surface that are disposed lateral to the attaching surface,
a connecting part that is in an upright position with respect to the attaching surface so as to form an L-shape, and includes a first side to which the another optical connector is to be connected and a second side that is opposite the first side and in contact with a distal end of the optical waveguide, and
a preventing part that prevents leakage of the adhesive, and includes a first protruding wall protruding upward from and formed at an outer edge of the first upper surface so as to extend in a longitudinal direction of the optical waveguide and a second protruding wall protruding upward from and formed at an outer edge of the second upper surface so as to extend in the longitudinal direction of the optical waveguide; and
a ferrule cover attached to the ferrule base to cover the cover attaching part, the ferrule cover including a pressing part that presses the optical waveguide bonded to the attaching surface, a first lower surface and a second lower surface that are disposed lateral to the pressing part, a first step formed at an outer side of the first lower surface, and a second step formed at an outer side of the second lower surface,
wherein the ferrule cover is attached to the ferrule base such that the first step and the second step are placed between the first protruding wall and the second protruding wall; and
wherein the cover attaching part, the connecting part, and the preventing part of the ferrule base are molded as a single piece.

2. The optical connector as claimed in claim 1, further comprising:
a boot attached to a rear end of a structure formed by the ferrule base and the ferrule cover, the optical waveguide passing through a hole formed in the boot, wherein
the ferrule base includes a first engaging part; and
the boot includes a second engaging part that engages with the first engaging part when the boot is inserted into the structure.

3. The optical connector as claimed in claim 1, wherein the ferrule cover includes a front end and a protrusion that protrudes from the front end, the protrusion being in contact with the second side of the connecting part such that a gap is formed between the second side of the connecting part and the front end of the ferrule cover.

4. The optical connector as claimed in claim 3, wherein the ferrule cover also includes a beveled part formed in a portion of the front end where the protrusion is not formed.

5. The optical connector as claimed in claim 1, wherein a height of the first upper surface is greater than a height of the attaching surface, and a height of the second upper surface is less than the height of the attaching surface.

6. The optical connector as claimed in claim 1, wherein a height of the first lower surface is greater than a height of the pressing part, and a height of the second lower surface is less than the height of the pressing part.

7. An optical connector connectable to another optical connector, the optical connector comprising:
an optical waveguide including a base and multiple cores arranged in the base;
a ferrule base formed by molding, the ferrule base including
a cover attaching part including a flat surface to which the optical waveguide is bonded with an adhesive, and
a connecting part that is in an upright position with respect to the cover attaching part, and includes a first side to which the another optical connector is to be connected and a second side that is opposite the first side and in contact with a distal end of the optical waveguide; and
a ferrule cover attached to the cover attaching part to cover the cover attaching part, wherein
the ferrule cover includes a beveled part formed on an upper end of a distal end surface of the ferrule cover opposing the second side of the connecting part, the beveled part sloping with respect to the distal end surface; and
the cover attaching part and the connecting part of the ferrule base are molded as a single piece.

8. The optical connector as claimed in claim 7, wherein the ferrule cover includes an opening that passes through the ferrule cover and leads to a space formed between the ferrule cover and the ferrule base.

* * * * *